United States Patent
Biardeau et al.

(10) Patent No.: US 6,517,231 B1
(45) Date of Patent: Feb. 11, 2003

(54) LIQUID STIRRER WITH MAGNETIC COUPLING

(75) Inventors: Olivier Biardeau, Equeurdreville (FR); Frédéric Lepresle, Beaumont-Hague (FR); Abderrezzak Cherifi, Octeville (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/807,145

(22) PCT Filed: Oct. 6, 1999

(86) PCT No.: PCT/FR99/02385
§ 371 (c)(1),
(2), (4) Date: Apr. 5, 2001

(87) PCT Pub. No.: WO00/21184
PCT Pub. Date: Apr. 13, 2000

(30) Foreign Application Priority Data

Oct. 7, 1998 (FR) .............................. 98 12557

(51) Int. Cl.[7] .................................................. B01F 13/08
(52) U.S. Cl. ...................................... 366/273; 366/274
(58) Field of Search ................................ 366/142, 273, 366/274

(56) References Cited

U.S. PATENT DOCUMENTS

| | | | | |
|---|---|---|---|---|
| 2,951,689 A | * | 9/1960 | Asp et al. ................ | 366/274 |
| 3,570,819 A | * | 3/1971 | Rosinger ................. | 366/273 |
| 4,199,265 A | | 4/1980 | Sanderson et al. ........ | 366/273 |
| 4,568,195 A | | 2/1986 | Herz et al. .............. | 366/274 |
| 5,533,800 A | | 7/1996 | Stiegelmann et al. ..... | 366/142 |

FOREIGN PATENT DOCUMENTS

| | | |
|---|---|---|
| DE | 44 34 558 | 4/1995 |
| DE | 44 39 306 | 5/1996 |

* cited by examiner

*Primary Examiner*—Joseph W. Drodge
(74) *Attorney, Agent, or Firm*—Cohen, Pontani, Lieberman & Pavane

(57) ABSTRACT

The stirrer comprises a driving magnetic portion (13) and a driven magnetic portion (14). The driven portion is for placing on the bottom of a receptacle ($5_1$) containing a liquid to be stirred. The driving portion (13) is controlled so as to drive the driven portion (14) in rotation about a predetermined axis of rotation ($8_1$) by means of magnetic coupling with the driving portion. The stirrer is characterized in that the driving and driven portions are configured in such a manner as to encourage the field lines (15) that result from the magnetic coupling to extend substantially perpendicularly to the axis of rotation in the vicinity of the driven portion. Axial attraction between the driving and driven portions is thus considerably reduced for given torque transmission to the driven portion, such that the driven portion (14) and the bottom of the receptacle ($5_1$) are subject to less wear during rotation of the driven portion.

37 Claims, 5 Drawing Sheets

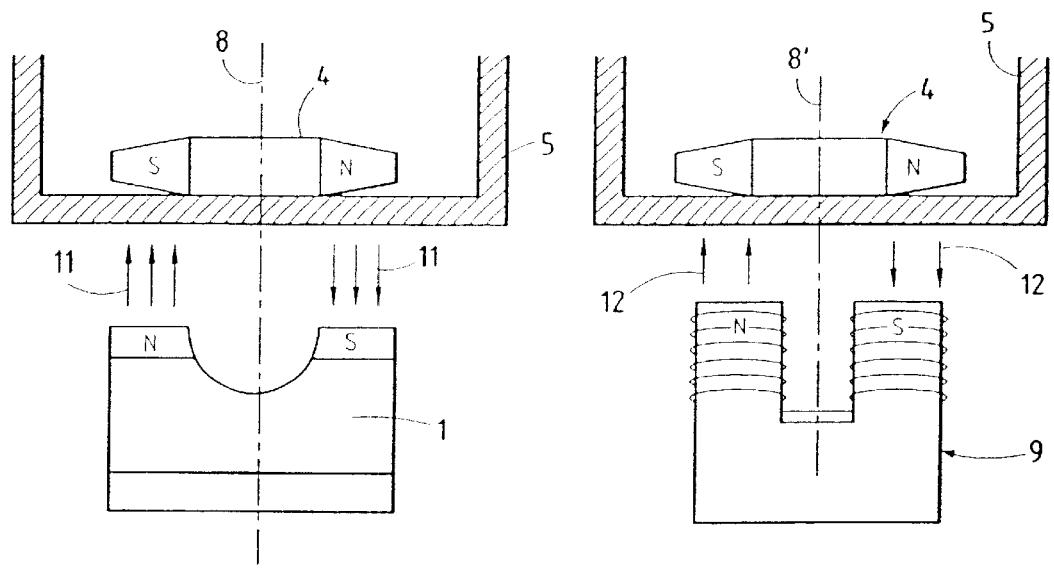
FIG.2A PRIOR ART
FIG.2B PRIOR ART
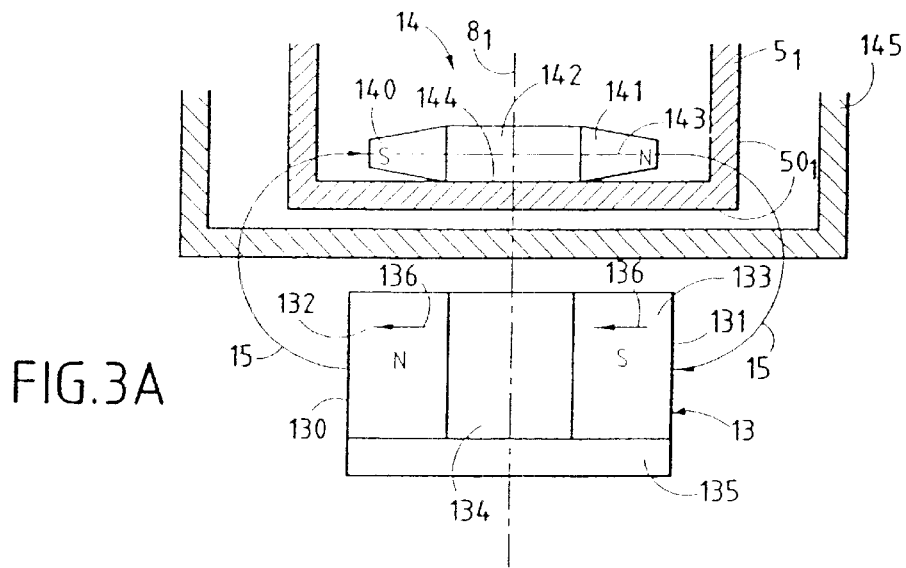
FIG.3A
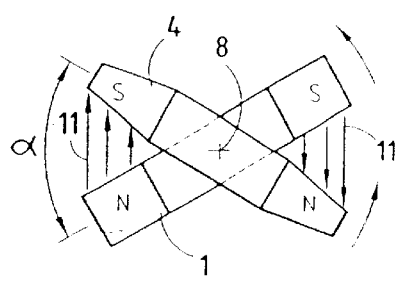
FIG.2C PRIOR ART
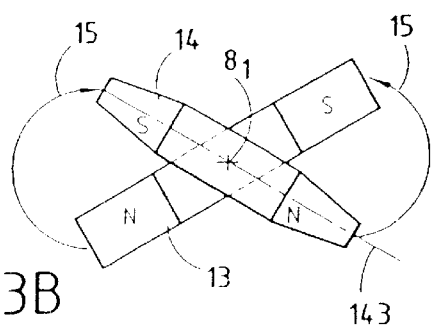
FIG.3B

LIQUID STIRRER WITH MAGNETIC COUPLING

This application is a 35 U.S.C. sec. 371 of PCT Application Ser. No. PCT/FR99/02385, filed on Oct. 6, 1999.

The present invention relates in general to liquid stirrers, and more particularly to stirrers with magnetic coupling.

DISCUSSION OF THE RELATED ART

Stirrers with magnetic coupling generally transmit rotary motion without contact from a driving magnetic portion to a driven magnetic portion. The driving and driven portions are disposed respectively outside and at the bottom of a receptacle of liquid to be stirred. This transmission of motion can be described as "coupling of the axial type without guidance for the driven portion".

Compared with less-recent stirrers having mechanical coupling, transmitting rotary motion without contact makes it possible to avoid having passages through the walls via mechanical rotary gaskets which present a risk of leakage.

FIGS. 1A and 1B show two known stirrers with magnetic coupling.

The stirrer of FIG. 1A comprises a driving magnetic portion 1 which can be rotated about an axis by a motor 2, in particular via transmission means 3, and a driven magnetic portion 4. The driven portion 4 is placed on the bottom of a receptacle 5 which is supported by means of a support 6 over the driving portion 1. The receptacle 5 and the support means 6 are made of non-magnetic material. The driving and driven portions 1 and 4, the transmission means 3, and the motor 2 are centered on a vertical axis of symmetry 8. The driven portion 4 is typically a permanent magnet in the form of a bar having a pair of north and south magnetic poles. The driving portion 1 is constituted by a U-shaped permanent magnet whose magnetic poles face the magnetic poles of the bar 4 when the stirrer is at rest. The magnets 1 and 4 are generally made of materials such as ferrites or alnicos (aluminum, nickel, cobalt).

When the motor 2 is in operation, the driven portion 4 is rotated about the axis of symmetry 8 by magnetic coupling with the driving portion 1 via an air gap 7. More precisely, when the driving portion 1 rotates about the axis 8 under drive from the motor 2, torque is transmitted to the driven portion 4, thereby causing it to turn about the same axis.

The receptacle 5 contains chemical reagents in liquid form. Rotation of the bar magnet 4 about the axis enables the liquids contained in the receptacle 5 to be stirred and, for example, favors the production of precipitates which are evacuated via an evacuation outlet 50 on a side face of the receptacle 5. With such a precipitation reaction, the stirrer shown in FIG. 1A can be referred to as a "precipitator".

FIG. 1B shows another known stirrer. In FIG. 1B, those elements which are identical to elements of FIG. 1A are designated using the same references. The stirrer of FIG. 1B differs from the stirrer shown in FIG. 1A in that the driving portion 1, the motor 2, and the transmission means 3 are replaced by a static drive 9 powered by an alternating (square wave) voltage source 10. The static drive 9 has vertically disposed electromagnets (one of which is shown diagrammatically in FIG. 2B) which are powered by a voltage delivered by the source 10 and are switched in alternation. The static drive 9 produces the same effect as the elements 1, 2, and 3 in FIG. 1A, i.e. it produces a rotating magnetic field which causes the bar magnet 4 to rotate by magnetic coupling about a vertical axis of symmetry 8'.

The stirrer with static drive shown in FIG. 1B presents several advantages over the stirrer with rotary motor of FIG. 1A. In particular, it does not require mechanical moving parts to be used and it is more compact. In addition, with the stirrer with static drive it is possible to vary the torque transmitted to the driven portion merely by modifying the amplitude of the current delivered to the coils of the electromagnets. In the case of the stirrer with rotary motor, the transmitted torque can be adjusted only by physically varying the size of the air gap by means of a mechanical device.

A major drawback of prior art stirrers as shown in FIGS. 1A and 1B lies in the fact that the amount of torque that can be transmitted to the driven portion is limited. Increasing this torque increases the attraction force pulling the bar 4 against the bottom of the receptacle and increases wear by friction both of the bar and of the bottom of the receptacle.

FIGS. 2A and 2B are diagrammatic front views of the relative positions of the driving and driven portions when the driving portion is constituted by a permanent magnet 1 (FIG. 2A) and when it is constituted by electromagnets 9 (FIG. 2B). FIG. 2C is a diagrammatic plan view showing the arrangement of FIG. 2A. As shown in FIG. 2C, when the stirrer is in operation, the driven portion 4 continuously lags behind the rotary field produced by the driving portion by an angle α. The field lines, represented by arrows 11 (FIGS. 2A and 2C) and 12 (FIG. 2B) between the poles of the driving and driven portions have a horizontal component (FIG. 2C) which contributes to the torque transmitted to the driven portion, and a vertical axial component (FIGS. 2A and 2B) parallel to the axis of rotation 8, 8'. The axial force due to the axial component constitutes a very large fraction of the interaction energy between the driving and driven portions. Any increase of the torque transmitted to the driven magnet 4 automatically increases the axial attraction between the driving and driven portions and thus increases wear of the driven magnet 4 and of the bottom of the receptacle 5 because of the presence of a significant axial component in the field lines.

SUMMARY OF THE INVENTION

The present invention seeks to provide a liquid stirrer which, compared with prior stirrers, makes it possible to reduce the wear on the driven portion and the bottom of the receptacle for given torque transmitted to the driven portion.

To this end, the invention provides a liquid stirrer with magnetic coupling comprising a driving portion and a driven portion, the driven portion being for placing on the bottom of a receptacle containing a liquid to be stirred, and control means for controlling the driving portion so as to drive the driven portion in rotation about a predetermined axis of rotation by means of magnetic coupling with the driving portion, the stirrer being characterized in that the driving and driven portions are configured so as to encourage the field lines that result from the magnetic coupling to extend substantially perpendicularly to said axis of rotation in the vicinity of the driven portion.

In practice, the driving and driven portions are preferably configured so as to encourage the field lines resulting from the magnetic coupling to extend substantially parallel to a longitudinal axis of the driven portion in the vicinity of the driven portion.

The predetermined axis of rotation is typically, but not necessarily, a vertical (virtual) axis of symmetry of the driven portion and/or of the driving portion. When the stirrer is in operation, the driven portion is merely placed on the bottom of the receptacle and is therefore subject only to its own weight, to friction forces with the bottom of the receptacle, and to the electromagnetic forces generated by the driving portion through the receptacle. The receptacle, or at least a portion thereof close to the driving portion, is made of a non-magnetic material, so as to allow the field lines to pass through.

Thus, contrary to prior stirrers, in the stirrer of the invention, a large part of the field lines in the vicinity of the driven portion have an axial component (parallel to the axis of rotation) which is small compared to their horizontal component. The axial attraction force which is an undesirable force because of the wear phenomena to which it gives rise both on the driven portion and on the bottom of the receptacle, is therefore smaller for identical torque. Consequently, a larger torque can be transmitted to the driven portion without increasing its wear, and without increasing wear on the bottom of the receptacle. Experimentally, the present inventors have observed that under certain conditions it is possible to increase torque by about 30%.

The increase in torque made possible by the present invention makes it possible to obtain greater stirring capacity, and, for example, to deal with the bottom of the receptacle becoming caked and with possible variations in the viscosity of the liquids contained in the receptacle. It also makes it possible to increase the air gap between the driving and driven portions, e.g. to allow the use of receptacles that are of greater thickness.

In the invention, the driven portion comprises a permanent magnet which is preferably made of neodium-iron-boron or of samarium-cobalt. These materials withstand demagnetization very well, unlike the materials conventionally used in prior stirrers which have a tendency to become demagnetized quite easily under the effect of an opposing magnetic field, which means that the magnets need to be replaced regularly, thereby increasing maintenance costs of such stirrers.

In a first embodiment of the present invention, the driving portion comprises at least one permanent magnet having at least one pair of magnetic poles whose active faces are substantially parallel to the axis of rotation. The magnetic poles of a given pair are typically of opposite polarities.

Advantageously, at least the poles of the permanent magnet of the driving portion are made of an anisotropic material. The permanent magnet is placed in such a manner that the magnetization direction of the anisotropic material is substantially perpendicular to the axis of rotation of the driven portion. The anisotropic material comprises, for example, strontium ferrite.

The magnetic poles of the permanent magnet of the driving portion are optionally united by a central part made of a ferromagnetic material such as soft iron. This central part makes it possible to avoid magnetic leakage in a direction parallel to the axis of rotation between the poles of the permanent magnet.

The control means comprises drive means for rotating the driving portion, which drive means includes a motor and transmission means for coupling the motor to the driving portion.

In a second embodiment of the invention, the driving portion comprises at least one electromagnet having at least two pairs of magnetic poles whose active faces are substantially parallel to the axis of rotation. The control means then comprises power supply means for feeding said at least one electromagnet with AC.

Said at least one electromagnet is typically constituted by an integer number p of electromagnets where p is greater than or equal to 2, and the power supply means feeds said p electromagnets with p-phase AC. The p electromagnets are arranged in a cross, each electromagnet constituting one of the branches of the cross.

In a third embodiment of the present invention, the driving portion comprises at least one permanent magnet having at least one pair of magnetic poles, and the distance between the magnetic poles of a given pair is substantially equal to or greater than the size of the driven portion in any direction perpendicular to the axis of rotation. The term "substantially equal" is used to mean a distance which is equal to, slightly greater than, or slightly less than the size of the driven portion in any direction perpendicular to the axis of rotation. The distance between the magnetic poles of a given pair is measured between the facing internal faces of the pair of poles.

The active faces of said at least one pair of magnetic poles are preferably substantially perpendicular to the axis of rotation.

The driving portion is rotated by drive means constituted by a motor and transmission means for coupling the motor to the driving portion.

In a fourth embodiment of the invention, the driving portion comprises at least one electromagnet having at least two pairs of magnetic poles, and the distance between the magnetic poles of a given pair is substantially equal to or greater than the size of the driven portion in any direction perpendicular to the axis of rotation. The control means comprises power supply means for feeding said at least one electromagnet with AC. Said at least one electromagnet is constituted, for example, by an integer number p of electromagnets where p is greater than or equal to 2, and the power supply means feeds said p electromagnets with p-phase AC. The driving portion comprises a yoke having p pairs of teeth extending substantially parallel to the axis of rotation, each pair of teeth constituting cores having coils of an electromagnet wound thereabout. The yoke is made up of laminations that are generally cylindrical in shape, concentric, and stacked radially.

In the above embodiments, the driven portion may be in the form of a bar having at least a central portion that is cylindrical. In addition, a magnetic element capable of producing asymmetry in the field lines can be provided so that the driven portion is also rotated about a longitudinal axis thereof, perpendicular to said axis of rotation, by magnetic coupling. This magnetic element can be situated on the driven portion or on the driving portion, and more precisely it can be situated on or close to one of the magnetic poles of the driving portion or of the driven portion. The magnetic element is a part made of a ferromagnetic material such as soft iron.

In another aspect of the invention, the stirrer includes a confinement wall made of a non-magnetic material in particular for confining the receptacle and protecting the driving portion from the liquid contained in the receptacle. The stirrer can thus be used to stir reagents that are dangerous, e.g. including nuclear materials.

BRIEF DESCRIPTION OF THE DRAWINGS

Other characteristics and advantages of the present invention will appear on reading the following detailed description of various embodiments made with reference to the accompanying drawings, in which:

FIG. 2A is a diagram of an arrangement for the driving and driven portions as used in the stirrer shown in FIG. 1A;

FIG. 2B is a diagram of an arrangement for the driving and driven portions used in the stirrer shown in FIG. 1B;

FIG. 2C is a diagrammatic plan view of the arrangement shown in FIG. 2A;

FIG. 3A is a diagram showing a liquid stirrer constituting a first embodiment of the present invention, and more particularly showing an arrangement for the driving and driven portions of the stirrer;

FIG. 3B is a diagrammatic plan view of the arrangement of driving and driven portions shown in FIG. 3A;

DETAILED DESCRIPTION OF THE INVENTION

Figures 1A, 1B:
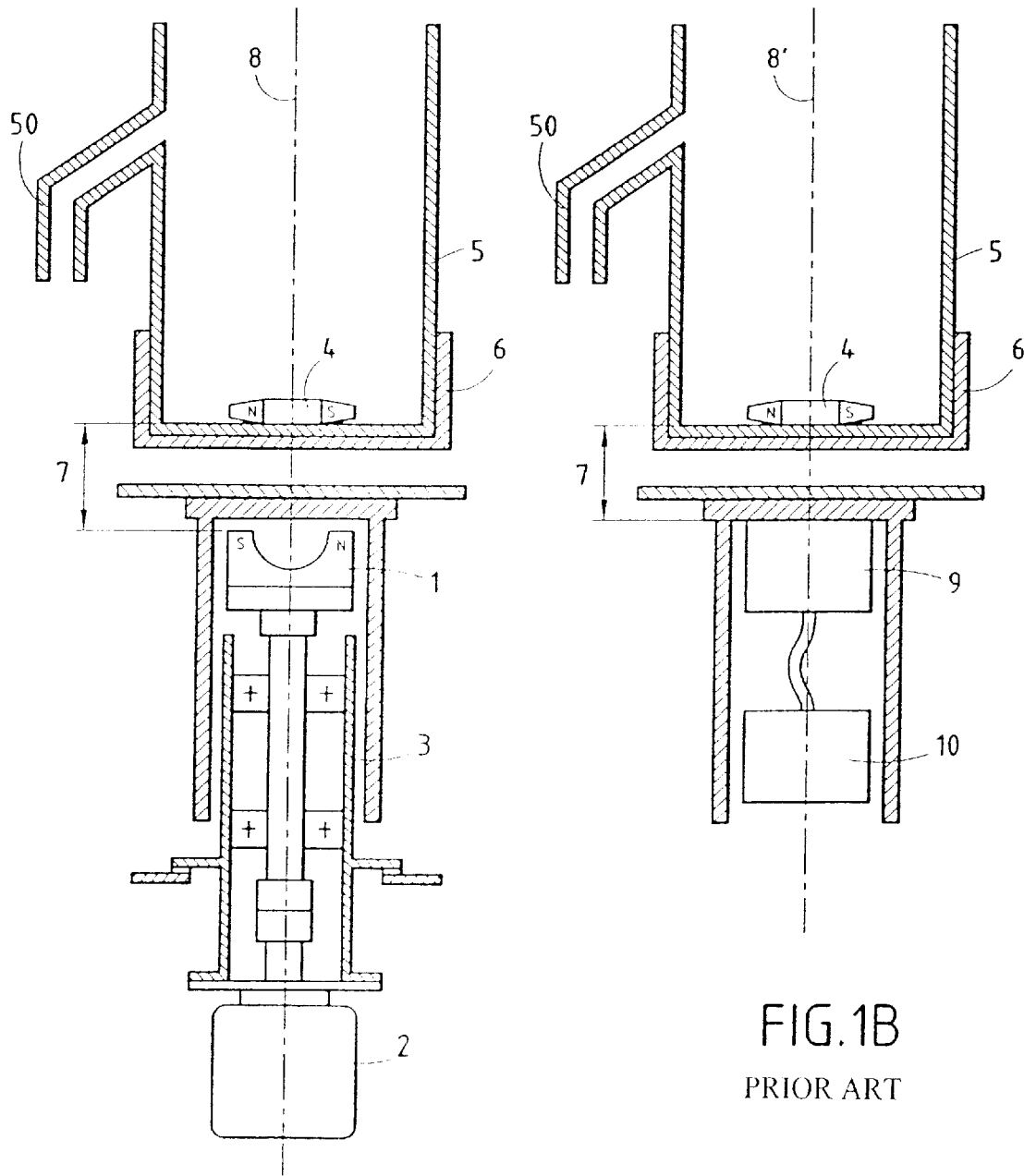
FIG. 1A is a diagram of a first known liquid stirrer with magnetic coupling.
FIG. 1B is a diagram of a second known liquid stirrer with magnetic coupling.

FIGS. 3A and 3B are diagrams respectively showing a front view and a plan view of a liquid stirrer constituting a first embodiment of the present invention. FIGS. 3A and 3B show mainly the driving portion, the driven portion, and the receptacle, respectively referenced 13, 14, and $5_1$. The stirrer of the invention also comprises, in particular, elements of the same type as the elements 2, 3, and 6 shown in FIG. 1A and not shown again in FIGS. 3A and 3B for reasons of clarity. More particularly, the driving portion 13 placed beneath the receptacle $5_1$ which has the driven portion 14 placed on the bottom thereof is itself driven in rotation by a motor about a vertical axis of symmetry $8_1$, thereby rotating the driven portion 4 about the same axis by contactless magnetic coupling. The receptacle $5_1$ or merely a bottom portion $50_1$ close to the driving portion 13 is made of a non-magnetic material.

The driven portion 14 is a magnetic bar having a south pole 140 and a north pole 141, both of which can be tapering in shape, for example, together with a cylindrical central portion 142. The magnetic bar 14 is made of neodium-iron-boron, for example.

The driving portion 13 comprises a permanent magnet whose active faces 130 and 131, i.e. the faces through which the major fraction of the magnetic field produced by the magnet passes, are parallel to the axis of rotation $8_1$. The permanent magnet is constituted by a north pole piece 132 and a south pole piece 133 united by a core 134 of ferromagnetic material such as soft iron, and a non-magnetic support 135 supporting the elements 132 to 134. The lengths of the driving and driven portions 13 and 14 are preferably substantially equal so that the north and south pole pieces 132 and 133 of the driving portion 13 are situated respectively beneath the south and north poles 140 and 141 of the magnetic bar 14. As soon as it has been placed on the bottom of the receptacle, the magnetic bar 14 takes up a position such that its vertical axis of symmetry and of rotation $8_1$ coincides with the vertical axis of symmetry of the driving portion 13.

In the invention, the pole pieces 132 and 133 of the driving portion 13 are made of an anisotropic material, e.g. strontium ferrite. The anisotropic material is cut in such a manner that its magnetization direction 136, and thus its remanent field, are oriented parallel to the magnetic bar 14, i.e. perpendicularly to the axis $8_1$. In practice, the axis $8_1$ is vertical and the direction of magnetization 136 is horizontal.

The soft iron core 134 makes it possible to ensure that a fraction of the magnetic field between the poles 132 and 133 does not escape towards the bar 14 along the axis $8_1$, which would increase the axial force between the driving and driven portions. The magnetic field inside the core 134 is oriented horizontally.

In the invention, the driving magnets 132-133-134 and the driven magnet 14 produce a coupling magnetic field whose field lines 15 generally leave the active side face 130 of the north pole piece 132 substantially horizontally to reach the north pole 140 of the driven magnetic bar 14 also substantially horizontally, and leave the north pole 141 of the driven bar 14 substantially horizontally to reach the active side face 131 of the south pole piece 133 substantially horizontally so as to form a loop, as shown diagrammatically in FIG. 3A. The field lines 15 extend more particularly in the vicinity of the poles of the driven magnet 14 substantially parallel to the longitudinal axis of the driven magnet, referenced 143. Given that the number of field lines extending in a direction having a significant axial component in the vicinity of the magnetic bar 14 is greatly reduced compared with the arrangement shown in FIG. 2A, the axial force between the driving and driven portions is minimized.

In the present invention, a leakproof protective wall 145 is provided between the driving portion 13 and the receptacle $5_1$. The protective wall 145 is made of non-magnetic material and serves to protect the driving portion 13 and the associated elements (motor, transmission means) from the chemical reagents contained in the receptacle $5_1$. This characteristic of the present invention is of particularly advantageous application in the nuclear field. When the reagents contained in the receptacle are nuclear materials, the protective wall 145 can be used to confine the dangerous portion of the stirrer, comprising in particular the driven portion and the receptacle.

Figure 4A:
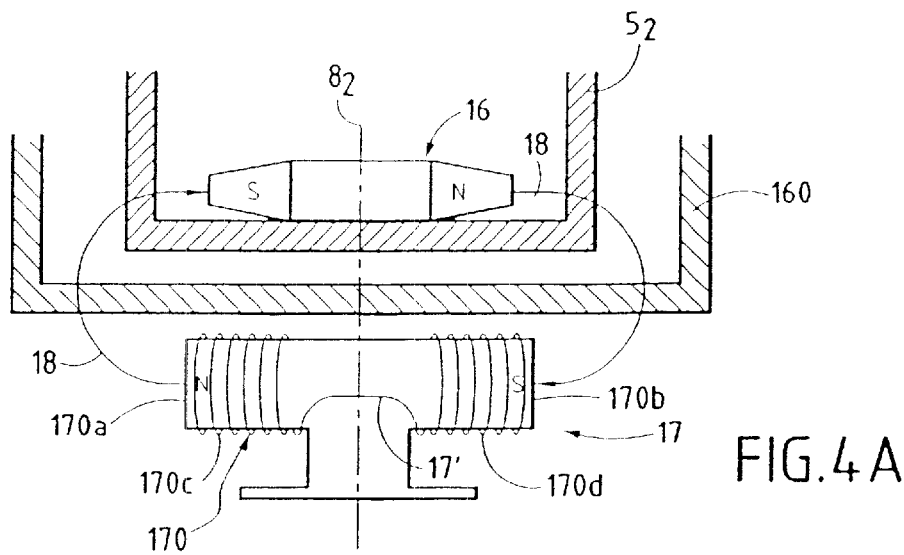
FIG. 4A is a diagram showing a liquid stirrer constituting a second embodiment of the present invention, and more particularly showing an arrangement for the driving and driven portions of the stirrer.
Figure 4B:
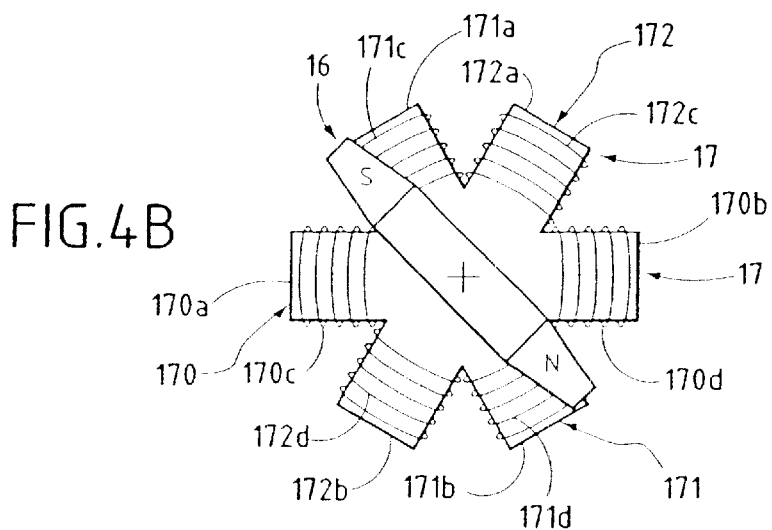
FIG. 4B is a diagrammatic plan view of the arrangement of driving and driven portions shown in FIG. 4A.

FIGS. 4A and 4B are respectively a simplified diagrammatic front view and a plan view of a second embodiment of the liquid stirrer of the invention. In this second embodiment, the stirrer comprises in particular a driven portion 16 identical to the driven portion 14 shown in FIGS. 3A and 3B and placed in a receptacle $5_2$, a protective wall 160, and a static driving portion 17 beneath the receptacle $5_2$ and the protective wall 160. The width of the drive portion 17 is preferably substantially equal to the length of the driven portion 16. The drive portion 17 comprises three stationary electromagnets 170, 171, and 172 extending horizontally and powered from a multiphase sinusoidal alternating current (AC) power supply (not shown). The active faces 170a–170b, 171a–171b, and 172a–172b of the respective electromagnets 170, 171, and 172 are parallel to the axis of rotation $8_2$ of the driven portion.

The electromagnets are disposed in a three-branch cross configuration, with each electromagnet forming one of the branches of the cross. Each electromagnet 170, 171, and 172 is constituted by a horizontal core having a pair of coils 170c–170d, 171c–171d, and 172c–172d wound on respective ends thereof. The coils of each electromagnet are interconnected as represented by wire 17' in FIG. 4A in respect of electromagnet 170.

The coils of the electromagnets 170, 171, and 172 are powered using three-phase AC. More precisely, the pair of coils 170c–170d, the pair of coils 171c–171d, and the pair of coils 172c–172d are powered respectively with alternating currents that are phase-shifted relative to one another by 120°. Each active face of an electromagnet constitutes a magnetic pole whose polarity varies as a function of the phase of the AC applied to the corresponding coils. This produces a rotating electromagnetic field which is equivalent to the field produced by the rotating magnet 13 in FIGS. 3A and 3B. Because the electromagnets are disposed horizontally, the field lines 18 between the active faces 170a, 170b, 171a, 171b, 172a, and 172b and the magnetic poles of the driven magnets 16 are comparable to the field lines 15 of FIGS. 3A and 3B. In particular, the field lines 18 generally extend substantially parallel to the longitudinal axis of the driven magnet 16 in the vicinity thereof.

The embodiment shown in FIGS. 4A and 4B uses three electromagnets. Nevertheless, a different number of electromagnets could be used, where said number is greater than or equal to two. In general, for an integer number p of electromagnets, where p is greater than or equal to 2, the electromagnets are arranged in a p-branch cross and p-phase AC is fed to the electromagnets. Each electromagnet is then powered with AC at a phase that is offset by +(360°/p) and −(360°/p) relative to the two closest electromagnets, respectively.

Figure 5:
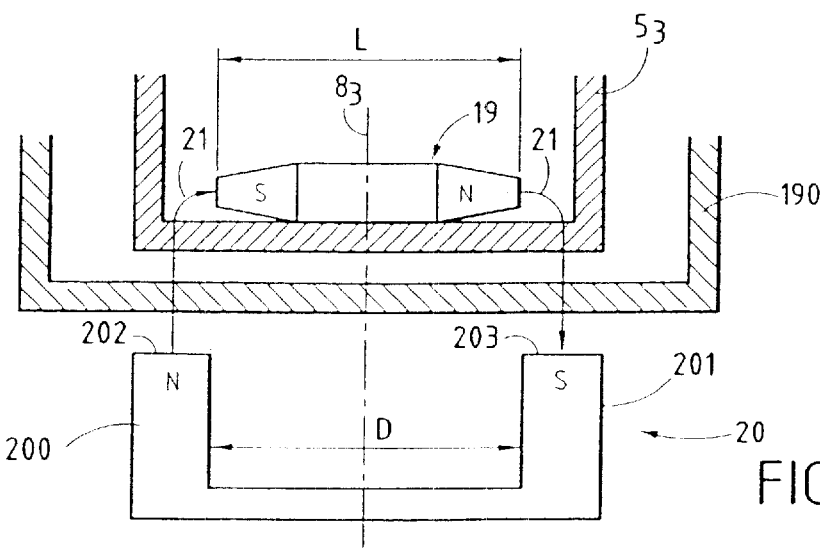
FIG. 5 is a diagram showing a liquid stirrer constituting a third embodiment of the present invention, and more particularly showing an arrangement for the driving and driven portions of the stirrer.

FIG. 5 shows a liquid stirrer constituting a third embodiment of the present invention. The stirrer in this third embodiment comprises in particular a driven magnet 19 identical to the magnets 14 and 16 and placed in a receptacle $5_3$, a U-shaped driving magnet 20, a receptacle $5_3$, elements (not shown) identical to the elements 2 and 3 in FIG. 1A for rotating the driving magnet 20 about a vertical axis of symmetry $8_3$ of the driving and driven magnets, and a protective wall 190. The driving magnet has a north magnetic pole 200 and a south magnetic pole 201 disposed symmetrically about the axis $8_3$ and having active faces 202 and 203 that are perpendicular to the axis $8_3$, i.e. parallel to the driven magnet 19.

In the present invention, the distance D between the poles 200 and 201 of the driving magnet 20 is at least substantially equal to the length L of the driven magnet 19, i.e. it is at least substantially equal to or greater than L. In this manner, the field lines 21 close to the driven magnet 19 extend generally substantially perpendicularly to the axis of rotation $8_3$ of the driven magnet, and more precisely in a manner that is substantially parallel to the longitudinal axis of the driven magnet.

Figure 6A:
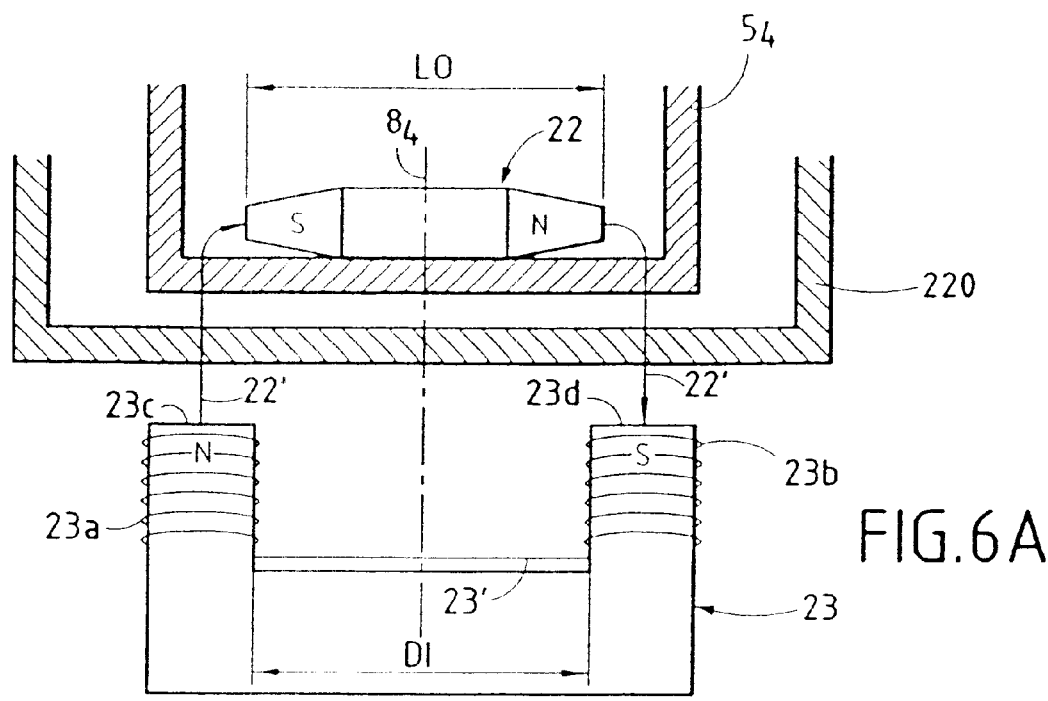
FIG. 6A is a diagram showing a liquid stirrer constituting a fourth embodiment of the present invention, and more particularly showing an arrangement for the driving and driven portions of the stirrer.

FIG. 6A is a simplified front view of a liquid stirrer constituting a fourth embodiment of the present invention. The stirrer in this fourth embodiment comprises in particular a driven magnet 22 identical to the magnets 14, 16, and 19 and placed in a receptacle $5_4$, together with a static driving portion 23 and a protective wall 220.

The driving portion 23 comprises a plurality of vertically extending electromagnets (only one electromagnet is shown in FIG. 6A). Each electromagnet has a pair of coils 23a–23b wound around two vertical cores disposed symmetrically about a vertical axis of symmetry $8_4$ of the driven magnet 22 and of the driving portion 23. The coils of each electromagnet are interconnected, as represented by wire 23'.

Each electromagnet is fed with AC from a power supply (not shown) and has two magnetic poles of varying polarity whose active faces 23c, 23d are perpendicular to the axis $8_4$. The polarity of each magnetic pole varies periodically as a function of the phase of the AC powering the electromagnet, such that a rotating electromagnetic field is produced in the air gap between the driving and driven portions.

Figure 6B:
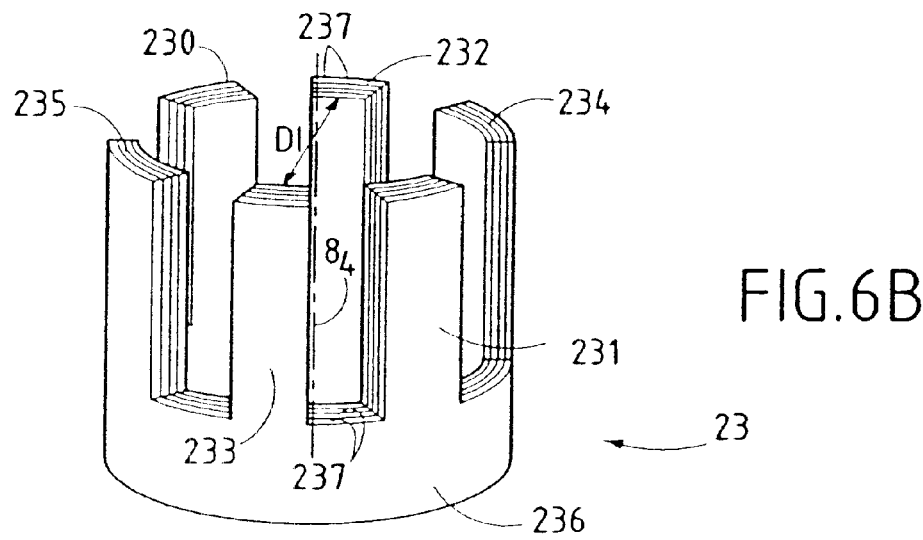
FIG. 6B is a diagram showing a magnetic circuit used as the driving portion in the stirrer shown in FIG. 6A.

FIG. 6B is a perspective view showing an example of a magnetic circuit used for providing static drive 23. In FIG. 6B, the coils are omitted for reasons of clarity. The magnetic circuit comprises a yoke made up of three pairs of vertical teeth 230—231, 232–233, and 234–235 disposed in a circle on a cylindrical base 236. Each tooth 230 to 235 constitutes a core around which a coil is wound. Thus, each pair of teeth 230–231, 232–233, and 234–235 is to receive a pair of coils symmetrically about the axis $8_4$ so as to form an electromagnet. The yoke is made up of laminations in the form of concentric cylinders 237 that are stacked radially.

In the present invention, the inside diameter DI of the yoke is substantially equal to the length LO of the driven magnet 22 or is greater than said length, so as to ensure that the field lines 22' extend substantially perpendicularly to the axis $8_4$ in the vicinity of the poles of the driven magnet 22.

In the example shown in FIG. 6B, three pairs of coils are used. These three pairs of coils are powered by three-phase AC, i.e. each pair of coils receives AC that is offset by 120° and −120° relative to the other two pairs of coils, respectively. In general, as described above with reference to FIGS. 4A and 4B, the magnetic circuit constituting the driving portion 23 can have an integer number p of pairs of coils where p is greater than or equal to 2 (i.e. it can have an integer number p of electromagnets where p is greater than or equal to 2) and the pairs of coils are fed with p-phase AC.

The above description of four embodiments relates to a driven magnet that is generally in the form of a cylindrical bar. It will be clear to the person skilled in the art that other shapes could be provided for the driven magnet. For example, it could have a horizontal cross-configuration with two pairs of magnetic poles. In the third and fourth embodiments shown in FIGS. 5 and 6A, 6B, the distance D between the magnetic poles of the driving magnet 20 (FIG. 5) and the diameter DI of the yoke of the magnetic circuit 23 (FIG. 6B) are generally chosen so that they are substantially equal to or greater than the size of the driven magnet in any direction perpendicular to the axis of rotation.

In all of the embodiments of the present invention as described above with reference to FIGS. 3A to 6B, when the driven magnet 14, 16, 19, or 22 is in the form of a substantially cylindrical bar, it is rotated about an axis of symmetry $8_1$ to $8_4$ which is orthogonal to its own longitudinal axis. The portion of the driven magnet which is in contact with the bottom of the receptacle $5_1$ to $5_4$ at any given instant is a generator line, referenced 144 in FIG. 3A, extending parallel to the longitudinal axis of the driven magnet.

In a variant of the invention, in order to prevent the generator line that is in contact with the bottom of the receptacle from remaining unchanged while the driven magnet is being rotated, i.e. in order to prevent the driven magnet from suffering wear due to friction with the bottom of the receptacle essentially along a single generator line and in the vicinity thereof, a magnetic element for providing asymmetry or unbalance is disposed on the driven magnet or the driving portion. This magnetic element is preferably a part made out of ferromagnetic material such as soft iron and it seeks to produce asymmetry in the field lines between the driving and driven portions in order to cause the driven magnet to rotate about its longitudinal axis. In the first and third embodiments of the invention using a rotating permanent magnet as the driving portion (FIGS. 3A and 3B), the element for providing asymmetry is preferably situated on one of the magnetic poles of the driving magnet, a part which is not subject to wear, but it can also be placed on one of the magnetic poles of the driven magnet. In the second and fourth embodiments using static drive for the driving portion (FIGS. 4A, 4B, 6A and 6B), the element for providing asymmetry is situated on one of the magnetic poles of the driven magnet.

Figure 7A:
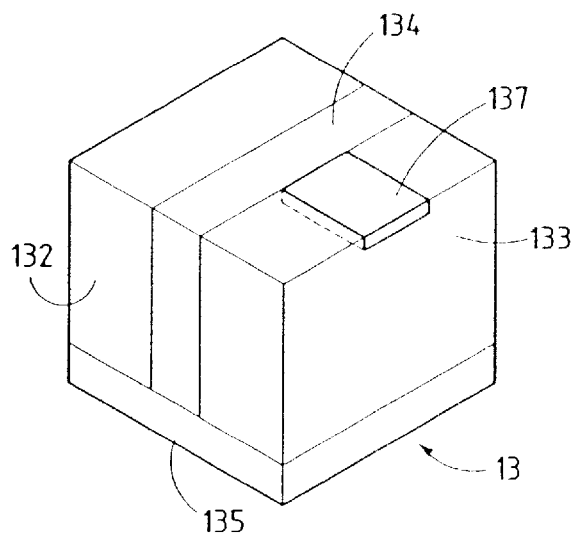
FIG. 7A is a diagrammatic perspective view of a driving permanent magnet used in the stirrer shown in FIG. 3A.
Figure 7B:
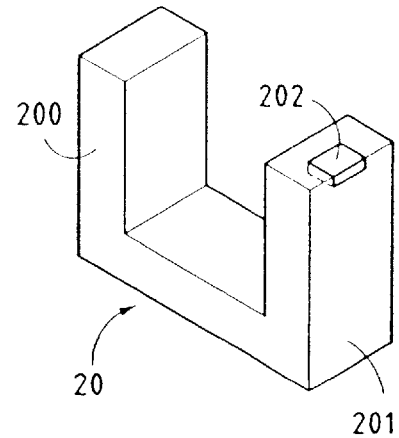
FIG. 7B is a diagrammatic perspective view of a driving permanent magnet used in the stirrer shown in FIG. 5.

With reference to FIG. 7A which is a perspective view of the driving magnet 3 in FIGS. 3A and 3B, the element for providing asymmetry, referenced 137, can be placed in a suitable notch formed in the pole piece 133. In comparable manner, in the third embodiment of the invention (FIG. 5), the element for providing asymmetry can be placed in a suitable notch formed in the pole piece 201 of the driving magnet 20, as shown by reference 202 in FIG. 7B.

Figure 8A:
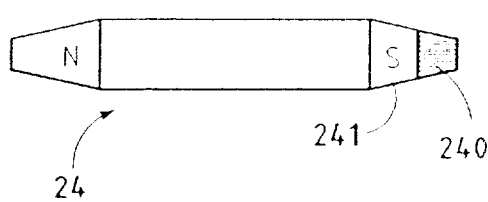
FIG. 8A is a diagram showing a driven magnet suitable for use in the stirrers shown in FIGS. 3A, 4A, 5, and 6A.
Figure 8B:
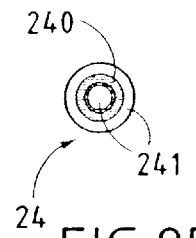
FIG. 8B is an end view of the driven magnet shown in FIG. 8A.

FIGS. 8A and 8B show a magnetic bar 24 of the same type as the magnets 14, 16, 19, and 22, but having a magnetic element 240 for providing asymmetry placed thereon. More particularly, the element 240 is placed on the surface of one of the poles 241 of the bar 24 in a suitable notch and its shape matches that of the pole 241. As mentioned above, the magnetic bar 24 carrying the element 240 is more particularly used as a driven magnet 16 or 22 when it is desired to cause the driven magnet to rotate about its longitudinal axis in embodiments that use static drive.

Figure 9:
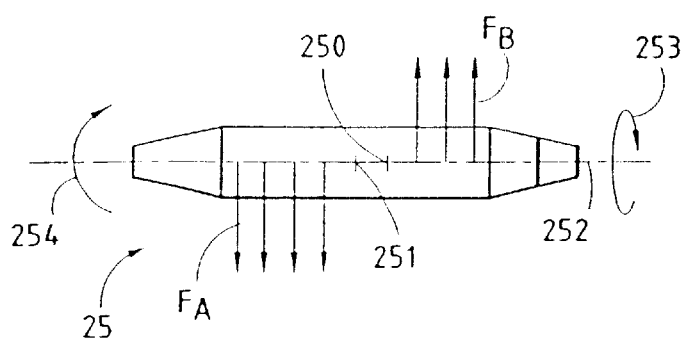
FIG. 9 is a diagram showing the effect produced on a driven magnet by a magnetic element for providing asymmetry included in the stirrers shown in FIGS. 3A, 4A, 5, and 6A.

FIG. 9 is a plan view showing the effect produced by the magnetic element for providing asymmetry on the driven magnet, given overall reference 25.

The element for providing asymmetry significantly alters the field lines between the driving and driven portions so that the "magnetic center of gravity" 250 of the driven magnet is offset from the center of symmetry 251. The driven magnet then rotates about a vertical axis passing through the point 250 and not about a vertical axis passing through the point 251. The friction forces $F_A$ and $F_B$ exerted on the magnet on either side of the point 250 by the bottom of the receptacle has different respective resultant magnitudes. The unbalance between these friction forces drives the magnetic bar 25 in rotation about its longitudinal axis 252, as represented by arrow 253, while the magnetic bar 250 is rotating about the vertical axis passing through the magnetic center 250, as represented by arrow 254.

Because the magnet rotates about its own longitudinal axis, the friction forces exerted by the bottom of the receptacle on the magnet are distributed over the entire cylindrical surface of the magnet during rotation thereof about its axis of vertical symmetry. As a result, wear on the magnet is not concentrated in a particular zone but is distributed uniformly over its entire surface.

What is claimed is:

1. A liquid stirrer with magnetic coupling comprising:
   a driving portion (13; 17; 20; 23);
   a driven portion (14; 16; 19; 22) in the form of a substantially cylindrical bar for placing on the bottom of a receptacle ($5_1$ to $5_4$) containing a liquid to be stirred; and
   control means (2, 3; 10) for controlling the driving portion so as to drive the driven portion in rotation about a predetermined axis of rotation ($8_1$ to $8_4$) by means of magnetic coupling with the driving portion,
   the stirrer being characterized in that it further comprises a magnetic element (137; 202; 240) capable of producing asymmetry in the field lines that result from the magnetic coupling, so that the driven portion is also driven in rotation about a longitudinal axis (252) thereof which is perpendicular to said axis of rotation ($8_1$ to $8_4$).

2. A stirrer according to claim 1, characterized in that the driven portion (14; 16; 19; 22) comprises a permanent magnet.

3. A stirrer according to claim 2, characterized in that the driving and driven portion are configured so as to encourage the field lines (15; 18; 21; 22') to extend substantially perpendicularly to said axis of rotation in the vicinity of the driven portion.

4. A stirrer according to claim 1, characterized in that the driving and driven portions are configured so as to encourage the field lines (15; 18; 21; 22') to extend substantially perpendicularly to said axis of rotation in the vicinity of the driven portion.

5. A stirrer according to claim 4, characterized in that the driving portion (13) comprises at least one permanent magnet (13) having at least one pair of magnetic poles (132, 133) whose active faces (130, 131) are substantially parallel to the axis of rotation.

6. A stirrer according to claim 5, characterized in that at least the poles (132, 133) of the permanent magnet (13) of the driving portion are made of an anisotropic material, and in that the permanent magnet of the driving portion is placed in such a manner that the magnetization direction (136) of the anisotropic material is substantially perpendicular to the axis of rotation ($8_1$) of the driven portion.

7. A stirrer according to claim 6, characterized in that said anisotropic material comprises strontium ferrite.

8. A stirrer according to claim 7, characterized in that the magnetic poles of the permanent magnet (13) of the driving portion are united by a central part (134) made of a ferromagnetic material.

9. A stirrer according to claim 5, characterized in that the magnetic poles of the permanent magnet (13) of the driving portion are united by a central part (134) made of a ferromagnetic material.

10. A stirrer according to claim 9, characterized in that the control means comprises drive means (2, 3) for rotating the driving portion (13).

11. A stirrer according to claim 5, characterized in that the control means comprises drive means (2, 3) for rotating the driving portion (13).

12. A stirrer according to claims 11, characterized in that the drive means comprises a motor (2) and transmission means (3) for coupling the motor to the driving portion (13).

13. A stirrer according to claim 4, characterized in that the driving portion comprises at least one electromagnet (17) having at least two pairs of magnetic poles whose active faces (172a, 173a, 172b, 173b, 172c, 173c) are substantially parallel to the axis of rotation.

14. A stirrer according to claim 13, characterized in that the control means comprises power supply means (10) for feeding said at least one electromagnet with AC.

15. A stirrer according to claim 14, characterized in that said at least one electromagnet is constituted by an integer number p of electromagnets (170, 171, 172) where p is greater than or equal to 2, and the power supply means feeds said p electromagnets with p-phase AC.

16. A stirrer according to claim 13, characterized in that said magnetic element (240) is situated on the driven portion.

17. A stirrer according to claim 16, characterized in that said magnetic element (240) is situated on or close to a magnetic pole of the driven portion.

18. A stirrer according to claim 17, characterized in that said magnetic element is a part made of a ferromagnetic material.

19. A stirrer according to claim 4, characterized in that the driving portion comprises at-least one permanent magnet (20) having at least one pair of magnetic poles (200, 201), and the distance (D) between the magnetic poles of a given pair is substantially equal to or greater than the size (L) of the driven portion in any direction perpendicular to the axis of rotation ($8_3$).

20. A stirrer according to claim 19, characterized in that the active faces (202, 203) of said at least one pair of magnetic poles are substantially perpendicular to the axis of rotation ($8_3$).

21. A stirrer according to claim 20, characterized in that the control means comprises drive means (2, 3) for rotating the driving portion (20).

22. A stirrer according to claim 19, characterized in that the control means comprises drive means (2, 3) for rotating the driving portion (20).

23. A stirrer according to claim 22, characterized in that the drive means comprises a motor (2) and transmission means (3) for coupling the motor to the driving portion.

24. A stirrer according to claim 19, characterized in that said magnetic element is situated on one of the driven portion and the driving portion.

25. A stirrer according to claim 5, characterized in that said magnetic element is situated on one of the driven portion and the driving portion.

26. A stirrer according to claim 25, characterized in that the magnetic element is situated on or close to a magnetic pole of the driving portion or of the driven portion.

27. A stirrer according to claim 4, characterized in that the driving portion comprises at least one electromagnet (23) having at least two pairs of magnetic poles, and the distance (DI) between the magnetic poles of a given pair is substantially equal to or greater than the size (LO) of the driven portion (22) in any direction perpendicular to the axis of rotation ($8_4$).

28. A stirrer according to claim 27, characterized in that the active faces (23c, 23d) of said at least two pairs of magnetic poles are substantially perpendicular to the axis of rotation ($8_4$).

29. A stirrer according to claim 28, characterized in that the control means comprises power supply means (10) for feeding said at least one electromagnet (23) with AC.

30. A stirrer according to claim 27, characterized in that the control means comprises power supply means (10) for feeding said at least one electromagnet (23) with AC.

31. A stirrer according to claim 30, characterized in that said at least one electromagnet is constituted by an integer number p of electromagnets (23a, 23b) where p is greater than or equal to 2, and the power supply means feeds said p electromagnets with p-phase AC.

32. A stirrer according to claim 31, characterized in that the driving portion comprises a yoke having p pairs of teeth (230–235) extending substantially parallel to the axis of rotation ($8_4$), each pair of teeth constituting an electromagnet core.

33. A stirrer according to claim 32, characterized in that the yoke is made of laminations (237) of generally cylindrical shape that are concentric and stacked radially.

34. A stirrer according to claim 27, characterized in that said magnetic element (240) is situated on the driven portion.

35. A stirrer according to claim 1, characterized in that said magnetic element is a part made of a ferromagnetic material.

36. A stirrer according to claim 35, characterized in that it includes a confinement wall (145; 160; 190; 220) made of a non-magnetic material for confining the receptacle and protecting the driving portion from the liquid contained in the receptacle.

37. A stirrer according to claim 1, characterized in that it includes a confinement wall (145; 160; 190; 220) made of a non-magnetic material in particular for confining the receptacle and protecting the driving portion from the liquid contained in the receptacle.

* * * * *